United States Patent
Kaye et al.

(10) Patent No.: US 7,116,324 B2
(45) Date of Patent: Oct. 3, 2006

(54) METHOD FOR MINIMIZING VISUAL ARTIFACTS CONVERTING TWO-DIMENSIONAL MOTION PICTURES INTO THREE-DIMENSIONAL MOTION PICTURES

(75) Inventors: Michael C. Kaye, Agoura Hills, CA (US); Charles J. L. Best, Los Angeles, CA (US)

(73) Assignee: In-Three, Inc., Agoura Hills, CA (US)

( * ) Notice: Subject to any disclaimer, the term of this patent is extended or adjusted under 35 U.S.C. 154(b) by 62 days.

(21) Appl. No.: 10/674,688

(22) Filed: Sep. 30, 2003

(65) Prior Publication Data

US 2005/0104879 A1     May 19, 2005

Related U.S. Application Data

(63) Continuation-in-part of application No. 10/316,672, filed on Dec. 10, 2002, which is a continuation-in-part of application No. 10/147,380, filed on May 15, 2002, which is a continuation-in-part of application No. 10/029,625, filed on Dec. 19, 2001, now Pat. No. 6,515,659, which is a continuation-in-part of application No. 09/819,420, filed on Mar. 26, 2001, now Pat. No. 6,686,926, which is a continuation-in-part of application No. 09/085,746, filed on May 27, 1998, now Pat. No. 6,208,348.

(51) Int. Cl.
    *G06T 15/00*     (2006.01)
(52) U.S. Cl. .......................... 345/419; 345/606; 382/60
(58) Field of Classification Search ................ 345/419, 345/418, 421, 422, 606, 607; 352/60, 61, 352/62

See application file for complete search history.

(56) References Cited

U.S. PATENT DOCUMENTS

| | | | |
|---|---|---|---|
| 3,621,127 A | 11/1971 | Hope | 348/56 |
| 3,737,567 A | 6/1973 | Kratomi | 348/56 |
| 3,772,465 A | 11/1973 | Vlahos et al. | 382/167 |
| 3,851,955 A | 12/1974 | Kent et al. | 352/60 |
| 4,017,166 A | 4/1977 | Kent et al. | 352/60 |
| 4,021,846 A | 5/1977 | Roese | 348/57 |
| 4,168,885 A | 9/1979 | Kent et al. | 352/129 |
| 4,183,633 A | 1/1980 | Kent et al. | 352/60 |
| 4,235,503 A | 11/1980 | Condon | 359/352 |
| 4,436,369 A | 3/1984 | Bukowski | 359/462 |
| 4,475,104 A | 10/1984 | Shen | 345/422 |
| 4,544,247 A | 10/1985 | Ohno | 352/62 |

(Continued)

FOREIGN PATENT DOCUMENTS

EP     1187494 A2     3/2002

(Continued)

OTHER PUBLICATIONS

Selsis et al., Automatic Tracking and 3D Localization of Moving Objects by Active Contour Models, Intelligent Vehicles 95 Symposium, Sep. 1995, pp. 96-100.*

(Continued)

*Primary Examiner*—Phu K. Nguyen
(74) *Attorney, Agent, or Firm*—Henricks, Slavin & Holmes LLP (57) ABSTRACT

A method for converting two-dimensional images into three-dimensional images includes: tracking an object in an image, the object having an object edge and an object outline thereabout, from frame to frame over a sequence of images; and creating object outlines in subsequent frames for converting two-dimensional images into three-dimensional images maintaining an object outline to object edge distance spacing relationship as the object moves or changes from frame to frame.

44 Claims, 9 Drawing Sheets

U.S. PATENT DOCUMENTS

| | | | | |
|---|---|---|---|---|
| 4,600,919 | A | 7/1986 | Stern | 345/473 |
| 4,603,952 | A | 8/1986 | Sybenga | 352/65 |
| 4,606,625 | A | 8/1986 | Geshwind | 352/38 |
| 4,608,596 | A | 8/1986 | Williams et al. | 358/81 |
| 4,645,459 | A | 2/1987 | Graf et al. | 434/43 |
| 4,647,965 | A | 3/1987 | Imsand | 348/47 |
| 4,697,178 | A | 9/1987 | Heckel | 345/422 |
| 4,723,159 | A | 2/1988 | Imsand | 358/88 |
| 4,809,065 | A | 2/1989 | Harris et al. | 345/428 |
| 4,888,713 | A | 12/1989 | Falk | 364/522 |
| 4,925,294 | A | 5/1990 | Geshwind et al. | 352/57 |
| 4,933,670 | A | 6/1990 | Wislocki | 345/167 |
| 4,965,844 | A | 10/1990 | Oka et al. | 382/47 |
| 5,002,387 | A | 3/1991 | Baljet et al. | 352/65 |
| 5,177,474 | A | 1/1993 | Kadota | 345/157 |
| 5,181,181 | A | 1/1993 | Glynn | 345/163 |
| 5,185,852 | A | 2/1993 | Mayer | 358/1.9 |
| 5,237,647 | A | 8/1993 | Roberts et al. | 345/419 |
| 5,341,462 | A | 8/1994 | Obata | 345/422 |
| 5,347,620 | A | 9/1994 | Zimmer | 345/592 |
| 5,402,191 | A | 3/1995 | Dean et al. | 352/63 |
| 5,428,721 | A | 6/1995 | Sato et al. | 345/650 |
| 5,481,321 | A | 1/1996 | Lipton | 352/57 |
| 5,699,444 | A | 12/1997 | Palm | 382/106 |
| 5,742,291 | A | 4/1998 | Palm | 345/420 |
| 5,748,199 | A | 5/1998 | Palm | 345/473 |
| 5,929,859 | A | 7/1999 | Meijers | 345/473 |
| 5,973,700 | A | 10/1999 | Taylor et al. | 345/427 |
| 6,011,581 | A | 1/2000 | Swift et al. | 348/58 |
| 6,023,276 | A | 2/2000 | Kawai et al. | 345/419 |
| 6,031,564 | A | 2/2000 | Ma et al. | 348/43 |
| 6,088,006 | A | 7/2000 | Tabata | 345/7 |
| 6,091,421 | A | 7/2000 | Terrasson | 345/419 |
| 6,166,744 | A | 12/2000 | Jaszlics et al. | 345/629 |
| 6,215,516 | B1 | 4/2001 | Ma et al. | 345/419 |
| 6,492,986 | B1* | 12/2002 | Metaxas et al. | 345/420 |
| 6,590,573 | B1 | 7/2003 | Geshwind | 345/419 |
| 6,650,339 | B1 | 11/2003 | Silva et al. | 345/619 |
| 6,677,944 | B1 | 1/2004 | Yamamoto | 345/422 |
| 6,798,406 | B1* | 9/2004 | Jones et al. | 345/419 |
| 2002/0048395 | A1 | 4/2002 | Harman et al. | 382/154 |
| 2002/0063780 | A1 | 5/2002 | Harman et al. | 348/14.05 |
| 2002/0075384 | A1 | 6/2002 | Harman | 348/51 |
| 2004/0004616 | A1 | 1/2004 | Konya et al. | 345/419 |

FOREIGN PATENT DOCUMENTS

| | | |
|---|---|---|
| WO | WO 97/24000A-1 | 7/1997 |
| WO | WO 99/12127 A1 | 3/1999 |
| WO | WO 99/30280 A1 | 6/1999 |
| WO | WO 00/79781 A1 | 12/2000 |
| WO | WO 01/01348 A1 | 1/2001 |
| WO | WO 02/13143 A1 | 2/2002 |

OTHER PUBLICATIONS

Smeulders et al., Tracking Nonparameterized Object Contours in Video, IEEE Transactions on Image Processing, vol. 11, No. 9, Sep. 2002, pp. 1081-1091.*

Murray et al., Active Tracking, IEEE International Conference on Intelligent Robots and Systems, Sep. 1993, pp. 1021-1028.*

Gao et al., Perceptual Motion Tracking from Image Sequences, IEEE, Jan. 2001, pp. 389-392.*

Yasushi Mae, Yoshiaki Shirai, Jun Miura, and Yoshinori Kuno, "Object Tracking in Cluttered Background Based on Optical Flow and Edges," *Proc. 13th Int. Conf. on Pattern Recognition*, vol. 1, pp. 196-200, Apr. 1996.

Di Zhong, Shih-Fu Chang, "AMOS: An Active System for MPEG-4 Video Object Segmentation," *ICIP* (2) 8: 647-651, Apr. 1998.

Hua Zhong, Liu Wenyin, Shipeng Li, "Interactive Tracker—A Semi-automatic Video Object Tracking and Segmentation System," Microsoft Research China, http://research.microsoft.com/asia.dload_files.group/mediasearching/icme_tracking-4th.pdf (downloaded Aug. 26, 2003).

Eric N. Mortensen, William A. Barrett, "Interactive segmentation with Intelligent Scissors," *Graphical Models and Image Processing*, v.60 n.5, p. 349-384, Sep. 2002.

Michael Gleicher, "Image Snapping," *SIGGRAPH*: 183-190, Jun. 1995.

Joseph Weber, Jitendra Malik, "Rigid Body Segmentation and Shape Description from Dense Optical Flow Under Weak Perspective," *IEEE Transactions on Pattern Analysis and Machine Intelligence*, vol. 19, No. 2, Feb. 1997, pp. 139-143.

E. N. Mortensen and W. A. Barrett, "Intelligent Scissors for Image Composition," *Computer Graphics (SIGGRAPH '95)*, pp. 191-198, Los Angeles, CA, Aug. 1995.

Hanrahan et al., "Direct WYSIWYG painting and texturing on 3D shapes", Computer Graphics, vol. 24, Issue 4, pp. 215-223. Aug. 1990.

Grossman, "Look Ma, No Glasses", Games, Apr. 1992, pp. 12-14.

Slinker et al., "The Generation and Animation of Random Dot and Random Line Autostereograms", Journal of Imaging Science and Technology, vol. 36, No. 3, pp. 260-267, May 1992.

A. Michael Noll, *Stereographic Projections by Digital Computer*, Computers and Automation, vol. 14, No. 5 (May 1965), pp. 32-34.

A. Michael Noll, *Computer-Generated Three-Dimensional Movies*, Computers and Automation, vol. 14, No. 11 (Nov. 1965), pp. 20-23.

* cited by examiner

METHOD FOR MINIMIZING VISUAL ARTIFACTS CONVERTING TWO-DIMENSIONAL MOTION PICTURES INTO THREE-DIMENSIONAL MOTION PICTURES

CROSS-REFERENCE TO RELATED APPLICATIONS

This application is a continuation-in-part of U.S. patent application Ser. No. 10/316,672 entitled "Method Of Hidden Surface Reconstruction For Creating Accurate Three-Dimensional Images Converted From Two-Dimensional Images" filed on Dec. 10, 2002, which is a continuation-in-part of U.S. patent application Ser. No. 10/147,380 entitled "Method For Conforming Objects To A Common Depth Perspective For Converting Two-Dimensional Images Into Three-Dimensional Images" filed on May 15, 2002, which is a continuation-in-part of U.S. patent application Ser. No. 10/029,625 entitled "Method And System For Creating Realistic Smooth Three-Dimensional Depth Contours From Two-Dimensional Images" filed on Dec. 19, 2001, now U.S. Pat. No. 6,515,659, which is a continuation-in-part of U.S. patent application Ser. No. 09/819,420 entitled "Image Processing System and Method for Converting Two-Dimensional Images Into Three-Dimensional Images" filed on Mar. 26, 2001, now U.S. Pat. No. 6,686,926, which is a continuation-in-part of U.S. patent application Ser. No. 09/085,746 entitled "System and Method for Converting Two-Dimensional Images into Three-Dimensional Images" filed on May 27, 1998, now U.S. Pat. No. 6,208,348, all of which are incorporated herein by reference in their entirety.

BACKGROUND OF THE INVENTION

In the process of converting a two-dimensional (2D) image into a three-dimensional (3D) image, at least two perspective angle images are needed independent of whatever conversion or rendering process is used. In one example of a process for converting two-dimensional images into three-dimensional images, the original image is established as the left view, or left perspective angle image, providing one view of a three-dimensional pair of images. In this example, the corresponding right perspective angle image is an image that is processed from the original image to effectively recreate what the right perspective view would look like with the original image serving as the left perspective frame.

In the process of creating a 3D perspective image out of a 2D image, as in the above example, objects or portions of objects within the image are repositioned along the horizontal, or X axis. By way of example, an object within an image can be "defined" by drawing around or outlining an area of pixels within the image. Once such an object has been defined, appropriate depth can be "assigned" to that object in the resulting 3D image by horizontally shifting the object in the alternate perspective view. To this end, depth placement algorithms or the like can be assigned to objects for the purpose of placing the objects at their appropriate depth locations.

In a motion picture, objects typically move (i.e., change position within the image, from frame to frame). An unfortunate consequence of some processes for converting two-dimensional images into three-dimensional images is that noticeable visual artifacts appear (e.g., as flickering or shuttering pixels) at object edges as objects move from frame to frame.

In view of the foregoing, it would be desirable to be able to convert two-dimensional motion pictures into three-dimensional motion pictures in such a manner that motion artifacts are significantly minimized or eliminated.

BRIEF DESCRIPTION OF THE DRAWINGS

Detailed description of embodiments of the invention will be made with reference to the accompanying drawings.

DETAILED DESCRIPTION

The following is a detailed description for carrying out the invention. This description is not to be taken in a limiting sense, but is made merely for the purpose of illustrating the general principles of the invention.

The present invention addresses the problem of image artifacts that can result from 2D to 3D motion picture image conversion processes. It has been observed that noticeable image artifacts sometimes occur when object edges are not defined consistently from frame to frame during such conversion processes. Accordingly, various methods of the present invention pertain to providing edges that define objects for converting two-dimensional images into three-dimensional images in a manner that is consistent from frame to frame (i.e., as the objects move over time).

In an embodiment of the present invention, a method for converting two-dimensional images into three-dimensional images includes: tracking an object in an image, the object having an object edge and an object outline thereabout, from frame to frame over a sequence of images; and creating object outlines in subsequent frames for converting two-dimensional images into three-dimensional images maintaining an object outline to object edge distance spacing relationship as the object moves or changes from frame to frame.

Motion Edge Artifacts and Correction:

As discussed above, visual artifacts in the form of inconsistencies at the edges of objects can result from conventional processes of converting 2D motion pictures into 3D motion pictures. These inconsistencies can become very noticeable with image object motion from frame to frame. It has been observed that such visual artifacts are caused by inconsistencies in the spacing between object outlines (or pathlines) and the actual edges of objects. (For purposes of this description, the terms "outline" and "pathline" are one and the same and interchangeable.) Various embodiments of the present invention exploit this observation and address the problem of noticeable (objectionable) artifacts resulting from 2D to 3D conversion processes by applying image data tracking techniques to maintain actual object edge to object pathline spacing relationships.

Thus, in an embodiment of the present invention, a method for converting two-dimensional images into three-dimensional images includes: defining an area of pixels around an object within an image frame of an image sequence, resulting in an outline of the object spaced a particular distance from edges of the object; tracking the object as the object moves or changes from frame to frame; and re-creating the outline in a different frame of the image sequence maintaining relative distances between the edges of the object and the outline to create a different perspective for a three-dimensional image. In another embodiment of the present invention, a method for converting two-dimensional images into three-dimensional images includes: defining an object within an image frame of an image sequence, resulting in an outline of the object spaced a particular distance from a perimeter of the object; tracking the object as the object moves or changes from frame to frame; and re-creating the outline in different frames of the image sequence maintaining relative distances between the perimeter of the object and the outline to create an alternate perspective for a three-dimensional image sequence.

Image data tracking according to the present invention can involve both edge detection and optical flow techniques. By tracking image data, a system can be implemented that is not only capable of maintaining object edge to object pathline spacing relationships as objects move over time, but also pertinent object information (e.g., depth placement information) pertaining to Virtual Objects, Sub-Objects, and Contour Points and Pathlines, as described in subsequent sections.

Figure 1A:
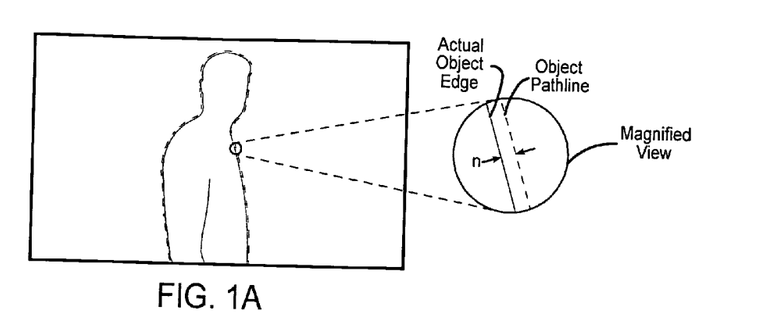
FIG. 1A illustrates an example image with a magnified view of the spacing differences between an actual object edge and an object pathline.

Referring to FIG. 1A, according to various embodiments of the present invention, the creation of accurate, artifact-free 2D to 3D motion picture conversions involves maintaining a near constant difference error, n, between the image object boundary and the associated object pathlines. Generally, and also as shown in FIG. 1, pathlines that define objects are slightly outside of the image object boundary in order to capture the image object in its entirety along with the smallest amount of background pixels behind the image object to allow for Pixel Repeat, if applicable. See, e.g., U.S. patent application Ser. No. 09/819,420 (describing "Repeat Pixel" feature: missing gap of pixels resulting from repositioning image object along the horizontal, or X axis can be filled by repeating pixels from the edge of the background object that the object is moving away from).

Figure 1B:
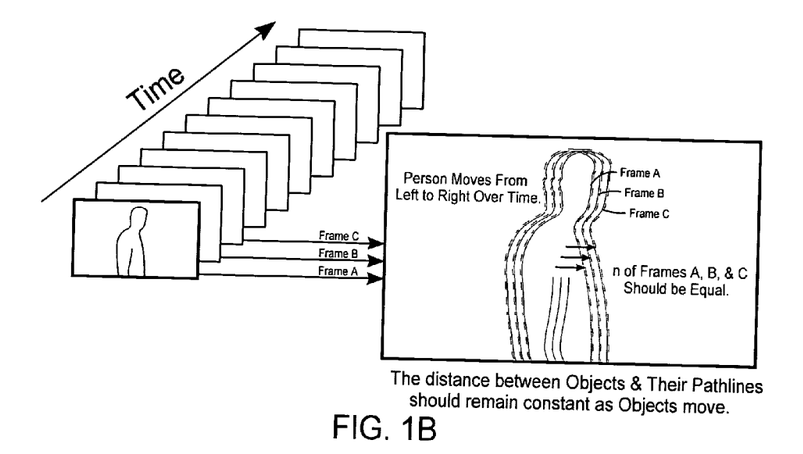
FIG. 1B illustrates a sequence of frames representing motion of a person and how object to pathline spacing relationships should remain constant as the object moves from frame to frame.

Referring to FIG. 1B, according to various embodiments of the present invention, as an object moves across the image over time, changes in the difference between the object edge and the defined pathline of the object are minimized with respect to the difference value at the initial frame time. If the object edge to object pathline distance spacing relationship becomes inconsistent as objects move, it has been observed that this can produce noticeable and distracting artifacts in the image. Generally, the greater the variation in the spacing between the image object and its pathline over time (from frame to frame), the more noticeable the artifacts become.

Figure 1C:
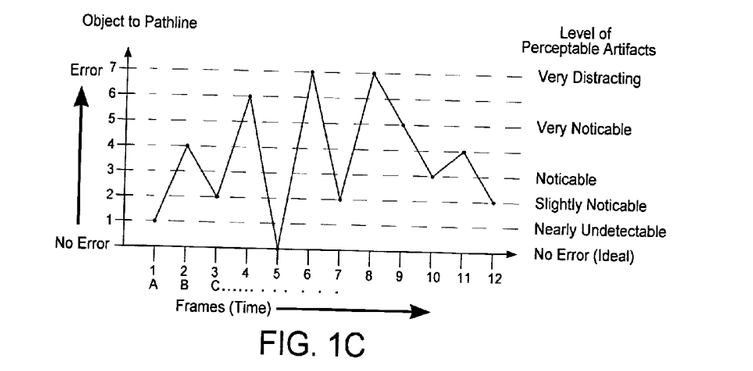
FIG. 1C is a graph providing a visual representation of object to pathline spacing relationship errors and corresponding levels of perceptible motion artifacts.

Referring to FIG. 1C, the graph illustrates the relationship between object to pathline error and the perceptibility of artifacts. The progression of object movement, frame by frame, is plotted along the X-axis. The level of artifact perceptibility (or noticeability) is plotted along the Y-axis. A greater number along the Y-axis represents a greater difference in object to pathline distance, which in turn represents a level of visual artifacts. In the illustrated example, the defined pathline for the object is varying in its distance from the edges of the object from frame to frame over time. If, on the other hand, and in the ideal scenario, a particular object has its outline defined consistently frame to frame over time relative to the actual object edge, there would be zero error on the graph along the bottom of the X axis and the object edges would be quiet, in a manner of speaking, not drawing attention to the object. The foregoing presumes that Hidden Surface Areas have also been appropriately corrected. For purposes of this description, "Hidden Surface Areas" refer to areas missing edge information. These areas cause a visual effect in an image (i.e., stimulating a different sensation) when a viewer focuses attention on them due to the fact they are only seen by one eye. The visual effect is caused by perspective differences at the edges between foreground and background objects. See, e.g., U.S. patent application Ser. No. 10/316,672 (describing "Hidden Surface Reconstruction" techniques).

Sufficiently large variations in the difference value may cause noticeable inconsistencies in object image boundaries. The solution according to various embodiments of the present invention is to ensure that object pathlines obey a maximum error threshold relative to the initial frame of definition. Assume that for a frame $f_i$ in a sequence $F = \{f\}_{i=0}^{N}$ the boundary of a region of an image object region can be represented as a simply connected closed path $p_i^0 \in \Re^2$ parameterizable on [0,1] and that the defined simply connected pathline $p_i^1 \in \Re^2$ of the object is parameterizable on [0,1]. Then for frame $f_i$, an error can be defined as:

$$e_i = \|p_i^0 - p_i^1\|.$$

Figure 2A:
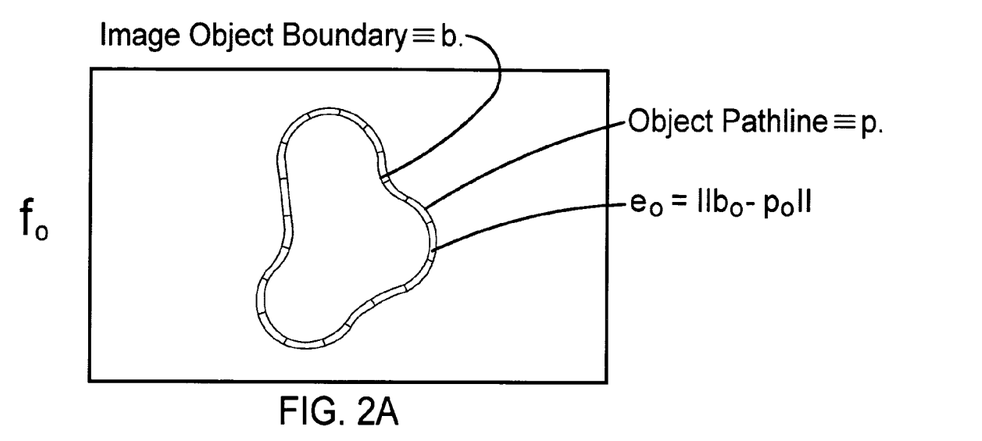
FIG. 2A is an illustration of an arbitrary object showing the object edge and its pathline.
Figure 2B:
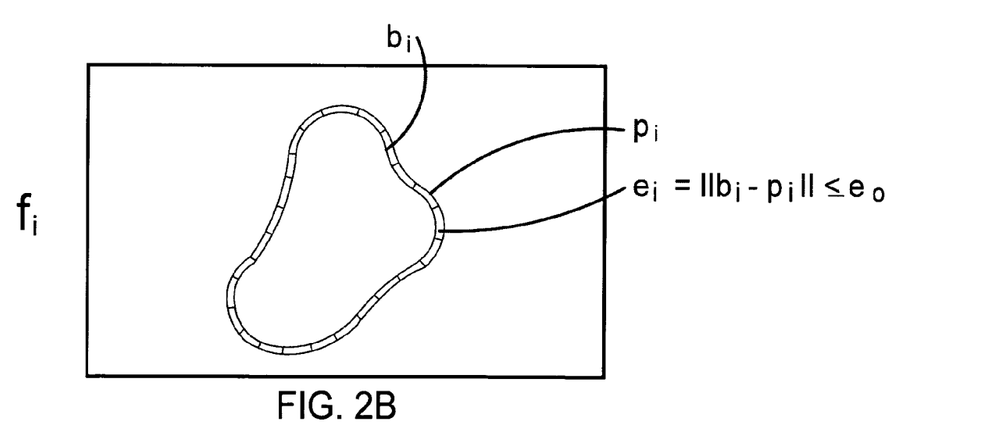
FIG. 2B is an illustration of the object of FIG. 2A showing change of the object shape at a different point in time.

Now for the frame, $f_0$, of the initial definition of the object, the following can be enforced:

$$e_i \leq e_0$$

for all frames in the sequence containing the object, as illustrated in FIGS. 2A and 2B. The norm $\|.\|$ can be chosen according to a severity of regulation to be imposed on the difference value. With this regulation, it can be ensured that extraneous area added to a boundary of an object through error in its defining pathline will be forced to an acceptable tolerance, providing an arbitrary control over, and therefore means of minimization of, variation in the difference error.

Thus, in various embodiments of the present invention, the object outlines obey a maximum error threshold relative to an initial frame of definition. Various methods for converting two-dimensional images into three-dimensional images according to the present invention include selecting a severity of regulation for the distance spacing relationship to force errors in the object outlines to an acceptable tolerance.

Figure 3A:
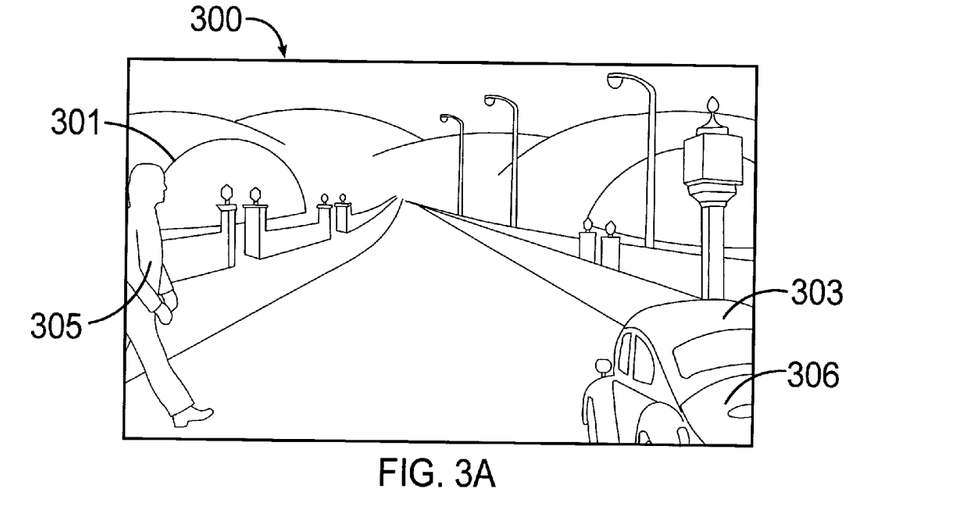
FIG. 3A illustrates an image with two objects, a person and a car, transitioning into the image frame.
Figure 3B:
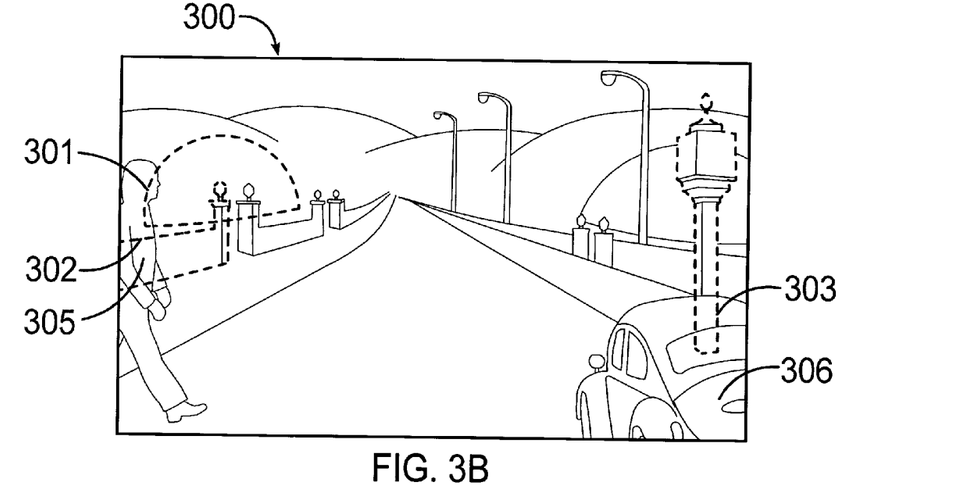
FIG. 3B illustrates the same image as FIG. 3A with the dome, wall, and street clock objects drawn as Virtual Objects.

Tracking Virtual Objects:

For purposes of the present description, the term "Virtual Objects" refers to objects that are defined in their entirety ignoring objects that may be in front of them. By way of example, and referring to FIG. 3A, an image 300 includes background and foreground objects. The background objects include a dome 301, a left wall 302, and a street clock 303. The foreground objects include a person 305 and a car 306 which are both partially out of view, or off screen. Referring to FIG. 3B, the dome 301, left wall 302, and street clock 303 are defined as Virtual Objects and are shown with dashed outlines. Because the dome 301, left wall 302, and street clock 303 are defined as Virtual Objects, the portions of these objects that are revealed over time, as the foreground objects person 305 and car 306 move out of the way (FIG. 4B), will have the correct depth information or shape associated with them. Thus, defining objects as Virtual Objects takes into account the fact that objects may be momentarily obstructed or out of view.

Figure 4A:
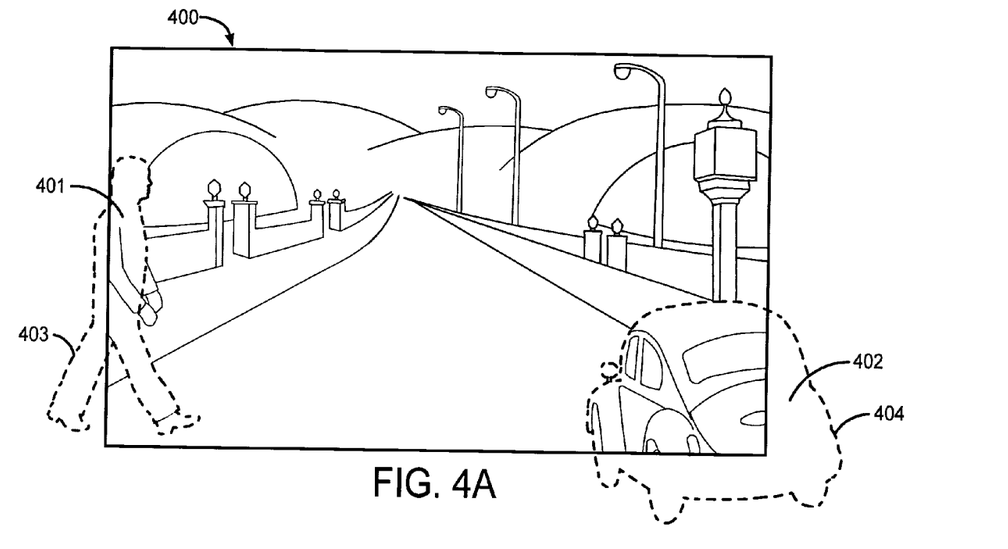
FIG. 4A illustrates the same image as FIG. 3A except with the person and car objects drawn as Virtual Objects.
Figure 4B:
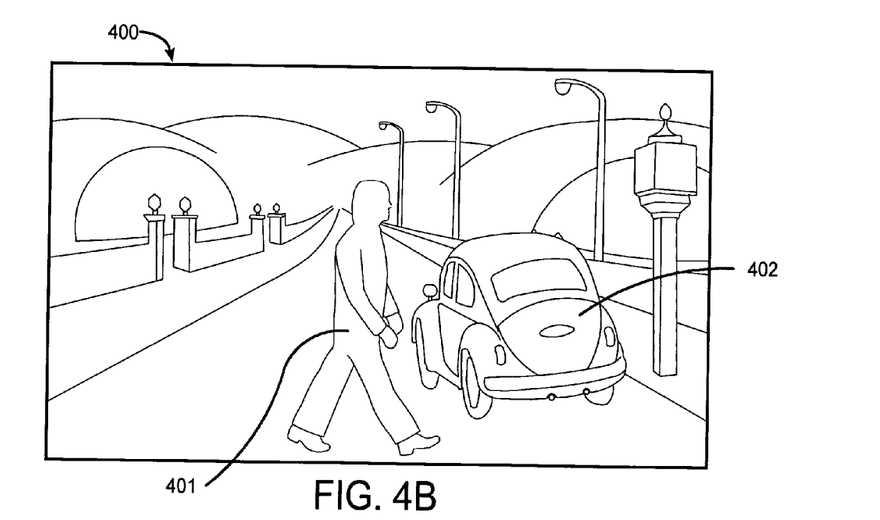
FIG. 4B illustrates an image subsequent to the image of FIG. 3A with both objects, the person and the car, fully in the image frame.

Referring to FIG. 4A, in order to provide correct shape to these objects, they can be drawn in their entirety even outside of the frame. In this example, the image 400 includes a person 401 and a car 402 as foreground objects. The person 401 and the car 402 are defined as virtual objects with portions 403 and 404 of their respective outlines extending outside of the image area. Although the object portions that are outside the image frame may be, for the most part, unknown, basic estimations or approximations of their shape can be employed making it significantly easier for an operator creating a 3D motion picture from a 2D motion picture to then apply appropriate depth contours or other information to provide correct shapes to the entirety of the objects. As a consequence, shapes are more easily maintained once the objects fully enter the image frame. By way of example, FIG. 4B shows a subsequent frame when both the person 401 and the car 402 have moved entirely into the frame with their respective shapes remaining as they were previously defined.

According to various embodiments of the present invention, Virtual Objects are tracked automatically along with the image objects as objects move frame by frame over time, for example, by employing an image data tracking technique. For frames where some pathline (outline) segments of image objects are outside the image frame area, the Virtual Object outline is still a complete outline. As such an object moves into the image frame, the object can remain "connected together" as a Virtual Object and move in its entirety. Thus, in various embodiments of the present invention, a virtual object corresponding to the object is defined such that the virtual object is tracked and the object outlines are generated independent of whether the object is obstructed from view in a subsequent frame by another object moving into the foreground.

Tracking Sub-Objects:

Objects can be partitioned as "Sub-Objects" for the purpose of applying multiple areas of depth information to individual objects. Sub-objects can be of any shape or size and, in some embodiments, are contained completely within the associated full object. Visually, sub-objects are pieces of the surface of the full object that can be, but are not necessarily, shaped differently than the general surface of the full object. The depth values associated with a full object and a sub-object associated with the full object match along the boundary (or portion of the boundary) of the sub-object contained within the full object so that there is a continuous variation in depth across the boundary from the surface defined by a sub-object to the general surface of the full object. One example of this could be the depth details within a person's face. Each feature within a person's face has certain depth characteristics, such as a person's eyes being somewhat recessed, the nose protruding, etc. Thus, sub-objects defined within objects facilitate the application of separate algorithms to the sub-object sections for greater flexibility in recreating the depth of otherwise flat 2D surfaces.

Figure 5A:
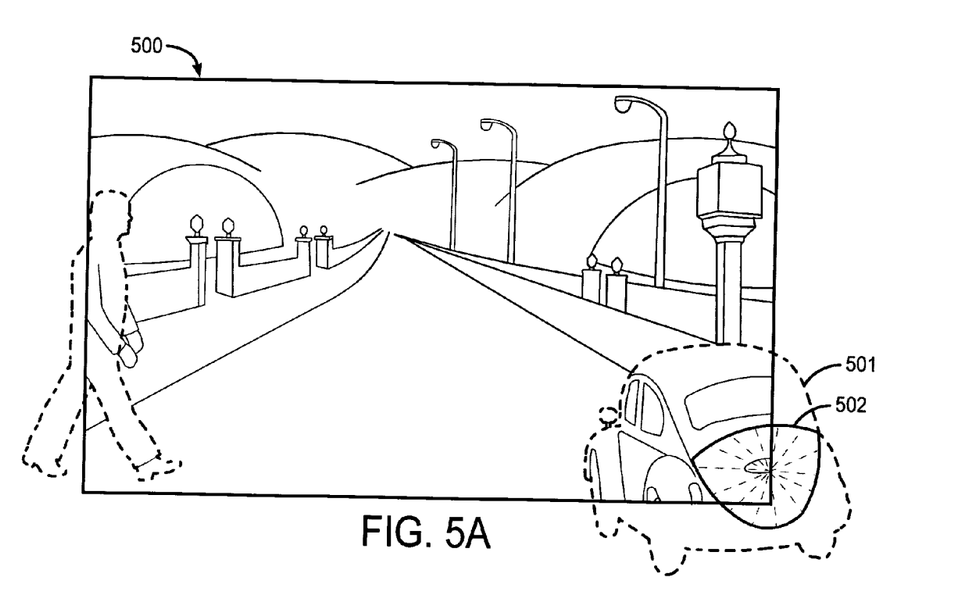
FIG. 5A illustrates the same image as FIG. 3A except with the person and car objects drawn as Virtual Objects with the car object including a Sub-Object.
Figure 5B:
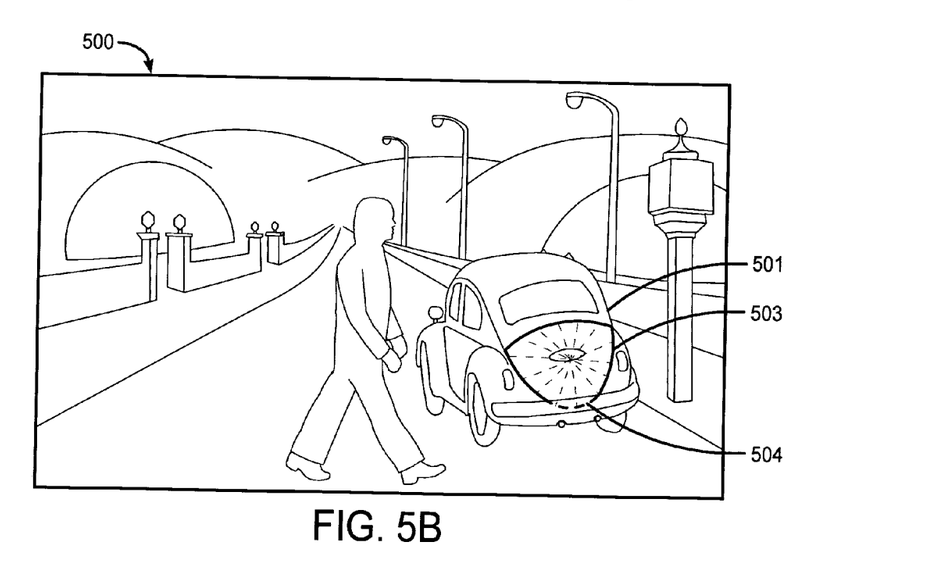
FIG. 5B illustrates the same image as FIG. 4B except with the back lid of the car being defined as a Virtual Object.

According to various embodiments of the present invention, Sub-Objects are tracked automatically along with the image objects as objects move frame by frame over time, for example, by employing an image data tracking technique. This allows Sub-Objects to automatically re-conform in the same manner as Virtual Objects. By way of example, and referring to FIG. 5A, an image 500 shows a car 501 (with a dashed outline) entering into the frame. In this example, a back lid 502 of the car 501 is defined as a sub-object. Separate depth shaping can be applied to the sub-object even though a portion of the object has not fully entered the frame. Referring to FIG. 5B, as the car 501 enters the image frame, the sub-object is tracked and its contour depth shape information adjusted as necessary frame by frame. Thus, in various embodiments of the present invention, one or more sub-objects contained within an object are defined such that the sub-objects are linked together and tracked as the object moves or changes from frame to frame.

Sub-objects can also be defined as Virtual Objects. Referring again to FIG. 5B, the back lid 502 can be defined as a Virtual Object the outline of which is shown by solid segment 503 which represents a visible portion of the object and by dashed segment 504 which represents a portion of the object hidden by the bumper of the car 501.

Tracking Contour Points and Pathlines:

In the 2D to 3D conversion process, contour information is used to provide shape to objects within images. By way of example, U.S. Pat. No. 6,515,659 to Kaye et al. entitled "Method And System For Creating Realistic Smooth Three-Dimensional Depth Contours From Two-Dimensional Images" describes techniques for applying variable but smooth depth contouring to image objects. Since objects defined in an image can be of any shape or size, the ability to apply contour information in such a manner results in a higher degree of realism in reconstructing graphical objects in three dimensions. By way of example, points and/or paths applied to objects provide convenient tools for creating crests, troughs or the like during the process of depth contouring the objects. This allows arbitrary shaping in the reconstruction of a three-dimensional surface of an object and object shaping with much greater depth detail, thereby producing an object with a surface that appears curved and shaped in three dimensions and imparting a high level of realism to the appearance of the final product.

A variety of control functions, interactive interfaces, etc. can be utilized for producing a three-dimensional shape that will make a particular object appear as a realistic three-dimensional recreation. By way of example, and referring to FIGS. 6A–6F, points and/or paths can be applied to objects for creating crests, troughs or the like during the process of depth contouring the objects. For example, an operator can freehand draw (or otherwise apply) a point or pathline anywhere within the object to define a crest or ridge of a bulge function that is to be applied to the object. Bulges generated by the contour pathlines can be convex or concave in screen depth coordinates depending on the amplitude and positive or negative direction (polarity) of the algorithm that the operator applies to each of the independent bulge points and/or contour pathlines. By way of example, if the operator applies a single point or path, a single bulge will occur. If the operator applies multiple points or paths, multiple bulges will occur.

Figure 6A:
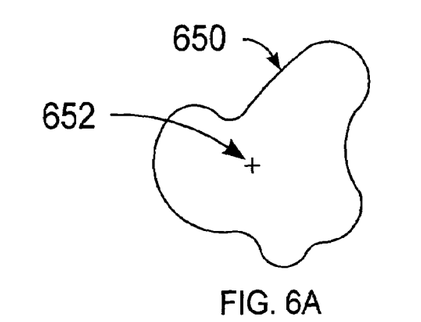
FIGS. 6A–6F illustrate how points and/or paths can be applied to objects for creating crests, troughs or the like during the process of depth contouring objects.
Figure 6B:
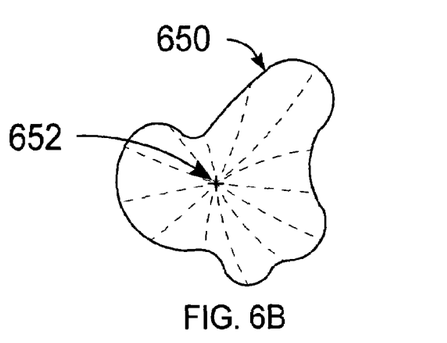
Figure 6C:
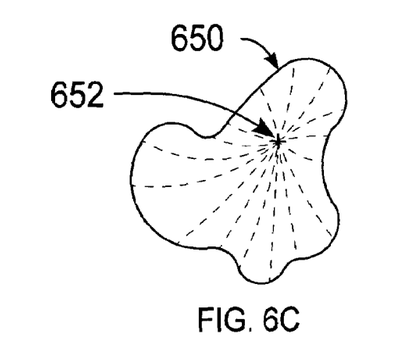

In FIG. 6A, a boundary perimeter 650 for a randomly shaped object is shown with a point 652 positioned therein. The point 652 can be user or otherwise-defined and positioned anywhere within the object. Depending upon the polarity of the algorithm applied to the object, an outward or inward appearing bulge is applied to the object as shown in FIGS. 6B and 6C, respectively.

Figure 6D:
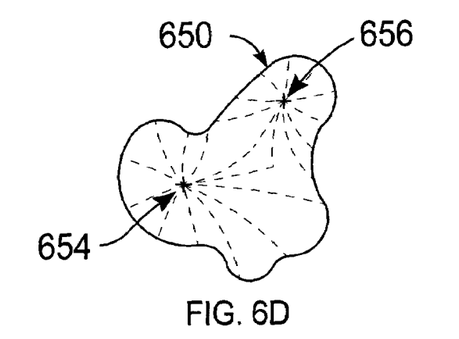

As discussed above, multiple points can be applied to an object for creating crests, troughs or the like during the process of depth contouring the object. In FIG. 6D, for example, points 654 and 656 have been applied to the object, resulting in multiple contoured bulges being applied to the surface of the object.

Figure 6E:
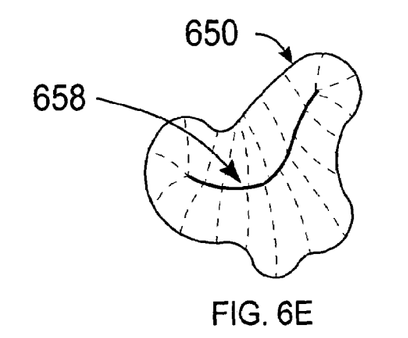
Figure 6F:
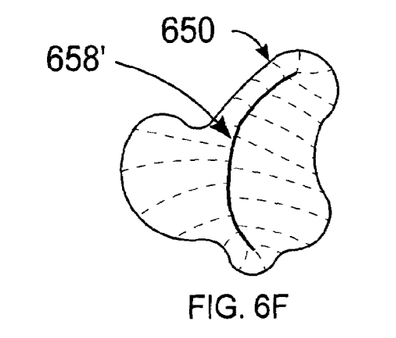

Also, as discussed above, one or more pathlines can be applied to an object for creating crests, troughs or the like during the process of depth contouring the object. In FIG. 6E, for example, pathline 658 defines a ridge of a depth contour applied to the object. In FIG. 6F, the pathline 658' defines a different ridge applied to the object and, therefore, different depth contouring. The pathlines 658 and 658' can, but do not necessarily define an upper or lower most point of a depth ridge to be created.

It should be appreciated that any number of points and/or pathlines can be applied to an object during the process of depth contouring the object. The amount of bulge, or amplitude, can then be adjusted accordingly to produce the desired and most realistic recreation of depth.

As objects move and/or change shape in each frame over time, depth contour information must follow along with the object to maintain a correct and consistent shape. If the shape is not consistent across frames, the object shape may be erratic and noticeably distracting as the object moves.

According to various embodiments of the present invention, depth contour information (such as Contour Points and Pathlines) are tracked automatically along with the image objects as objects move frame by frame over time, for example, by employing an image data tracking technique. This allows depth contour information to automatically re-conform in the same manner as Virtual Objects and Sub-Objects; and the shapes of objects automatically reform as the objects move and/or change from frame to frame. As an object moves from frame to frame, the depth contour information, such as contour pathlines, follow the movement of the object and reform their shape along with the changes in the object itself. Thus, in various embodiments of the present invention, one or more points contained within an object are associated with depth information and defined such that the one or more points track the object as the object moves or changes from frame to frame. In various embodiments of the present invention, one or more contour pathlines contained within an object are associated with depth contour information and defined such that the one or more contour pathlines track the object as the object moves or changes from frame to frame.

Tracking Strategies:

According to various embodiments of the present invention, the object outlines can be created employing a pixel image data tracking technique, a key frame curve interpolation technique, or a combination of pixel image data tracking and key frame curve interpolation techniques. With minimal user input, a consistent and accurate sequence of object pathlines across a sequence of frames can be generated by methods utilizing pixel image data tracking and/or key frame curve interpolation. It should be appreciated, however, that other methods for object segmentation in a sequence of images based on the object segmentation of an initial image or a proper subset of images in the sequence can be employed.

Figures 7A, 7B:
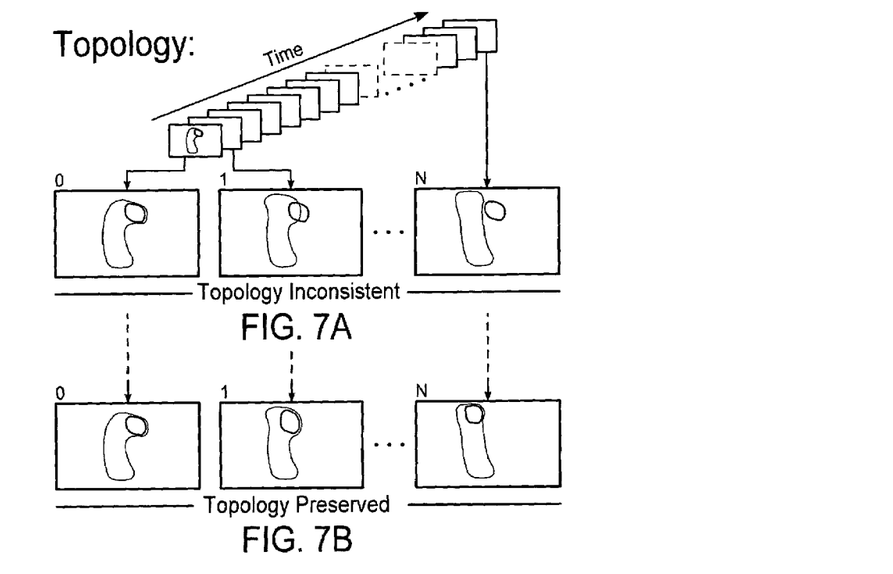
FIGS. 7A and 7B show examples of inconsistent topology and consistent (or preserved) topology, respectively.
Figure 8A:
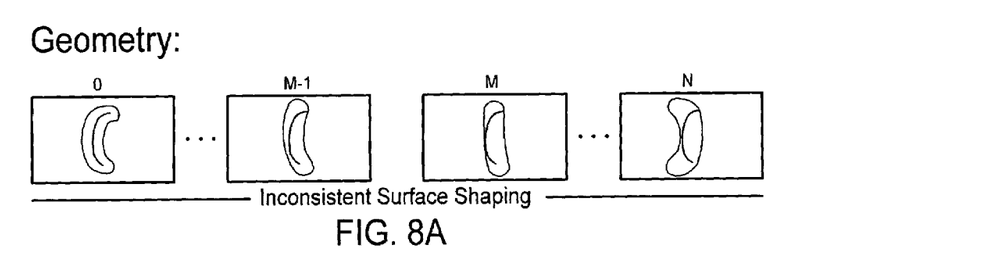
FIGS. 8A and 8B show examples of inconsistent surface shaping and consistent surface shaping, respectively.
Figure 8B:
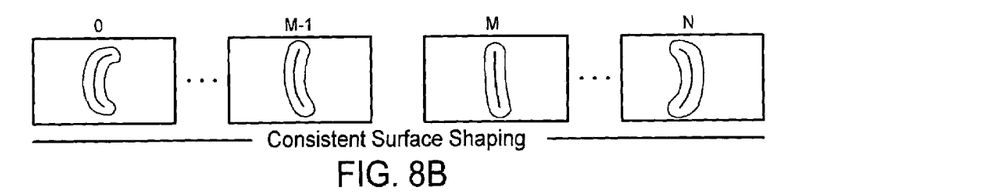

With respect to maintaining and updating the shaping constructs of an object in a way that is consistent with the associated object, consistent topology and consistent geometry are the two most important considerations. Topologically, constructs initially contained by the closure of the object pathline should remain inside of this planar set over time. FIGS. 7A and 7B show examples of inconsistent topology and consistent (or preserved) topology, respectively. Geometrically, object surface shaping should remain consistent with the geometry of the user's initial or key definitions. FIGS. 8A and 8B show examples of inconsistent surface shaping and consistent surface shaping, respectively.

Key Frame Curve Interpolation Strategy:

Using an appropriate family of curve approximation (b-spline approximations, bezier approximations, etc.), a curve shape can be defined in several user-selected "key frames" of an image sequence and likely shapes for the undefined frames can be interpolated from the "key frame" data. Although implementation of these interpolative methods generally generate curves in the undefined frames that both closely approximate the actual outline of the image object and are consistent with the "key frame" data, the various constructs of the object can be tracked appropriately, as discussed above.

Figure 9:
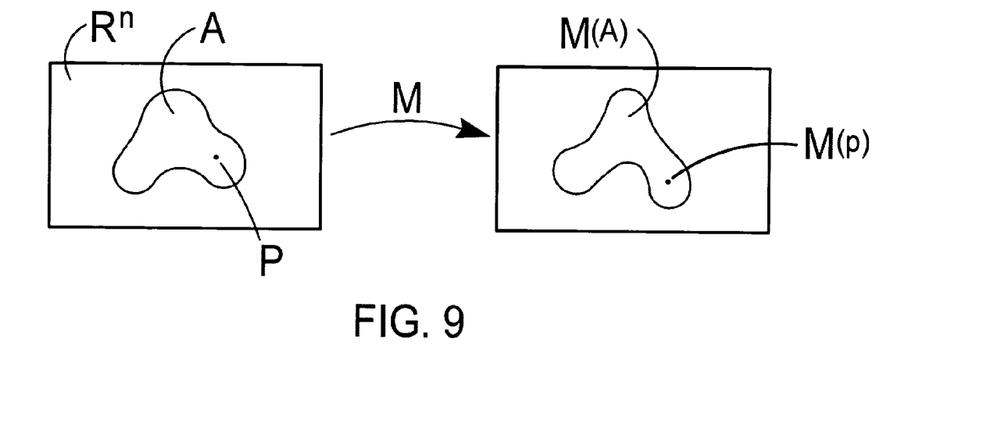
FIG. 9 illustrates an interpolative mapping, M, for mapping from one "key frame" to the next according to an example embodiment of the present invention.

According to various embodiments of the present invention, interpolative techniques can be employed to consider the input "key frame" data and to generate a discrete and sequential mapping from one "key frame" to the next. This map is then applied to each time step in between two "key frames" to approximate the missing data in the frames between. This map is, by construction, a homeomorphism. Referring to FIG. 9, this means that the topology of point-sets that the map is applied to is preserved; thus, given the interpolative mapping, M, and a set A and point p such that:

$$M: R^n \to R^n, A \subseteq R^n, p \in A.$$

results in $$p \in A \to M(p) \in M(A).$$

This means that if the interpolative map constructed from the object pathline "key frame" data is applied to the curve/point-based constructs contained in the object, these constructs will remain inside of the object (as in FIG. 7B).

The interpolative, by construction, also preserves the relative geometry of a set, so that if this map is applied to internal curve/point-based constructs, these constructs will follow, in an appropriate geometry, the change in character of the object pathline (as in FIG. 8B). This preserves the spirit of the user's initial object shape definition, while requiring the user to define the shaping constructs only in the initial frame—this data is not needed in the "key frames", only the pathline data for the object is needed in the "key frames".

It is important to note that this strategy does not use any image data, and therefore, can be applied to Virtual Objects with the same degree of accuracy as fully visible objects.

Image Data Tracking Strategy:

According to various embodiments of the present invention, an object pathline in an initial frame is correlated with the actual image data of the object and the image data is used to track the transition of individual image object pixel points across a sequence of frames while preserving regularity in the topology and the geometry of constructs within the object (such as sub-objects and shaping contours). Some example image data tracking strategies for regulating these two properties are set forth below.

One method is to track an object pathline from one image to the next using image data. A general homeomorphic mapping can then be constructed from the initial pathline to the updated pathline and this map can be applied to all constructs contained in the object, producing results similar to those discussed in the previous section.

Another method is to use image data to track all object constructs separately and then clamp any constructs that violate the geometry and topology constraints to the boundary of the object, i.e., the object pathline.

Image data tracking techniques generally ensure some level of uniqueness, i.e., if the same pixel is passed in to the algorithm multiple times, the same solution will be given each time. This means that boundary conditions are preserved: for example, if a sub-object has part of its pathline in common with the object, that section of the sub-object pathline will be moved exactly as the associated object pathline section. However, interior containment may not be preserved so that a contour point inside the area defined by the object pathline my not be inside the updated area after tracking, especially if the tracking algorithm updates the object outline in the next image but fails to find the contour point in that image. Similar issues may occur with sub-objects, producing results similar to those shown in FIG. 7A.

Figure 10:
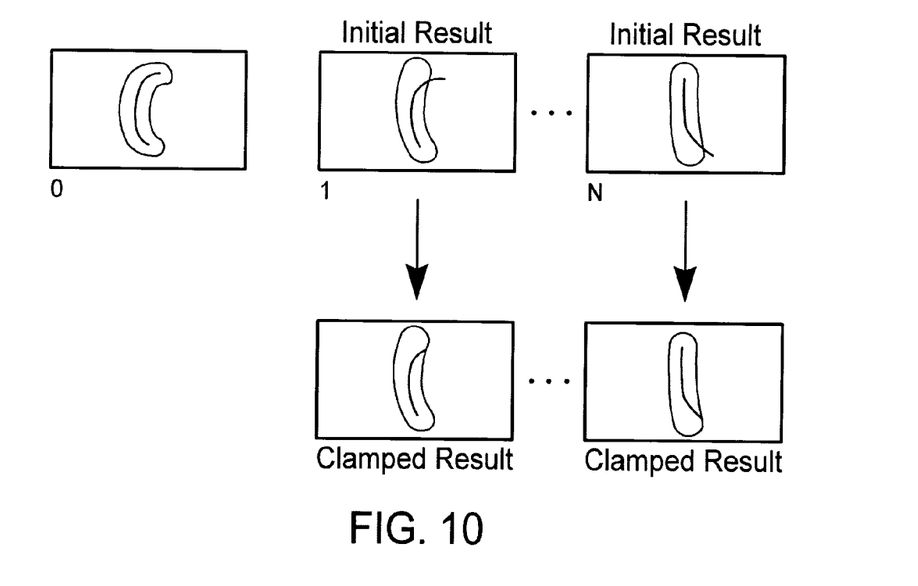
FIG. 10 illustrates clamping data to the boundaries of objects according to an example embodiment of the present invention.

According to various embodiments of the present invention, and referring to FIG. 10, this problem can be addressed by clamping all data to the boundary of the object, intersecting the resultant construct with the resultant object pathline. In this way, the image data that is capable of being tracked can be used, preserving the general shaping of the object while updating the object and its constructs with minimal input from the user and efficiently generating visually correct and consistent objects.

For some image objects, image data may be missing (e.g., for "hidden areas" of image objects). In such cases, information about the movement of those parts of the object pathline that can be tracked can be employed to approximate the movement of pathline sections lying over missing image data. To this end, Virtual Objects can be employed. Additionally, a well defined mapping can be defined by the movement of track-able portions of the object pathline and this mapping can then be applied to untrack-able portions of the pathline, allowing all portions of the object pathline to be tracked with an acceptable level of regularity. See, "Motion Edge Artifacts and Correction" section, supra, regarding object regulation.

Figure 11:
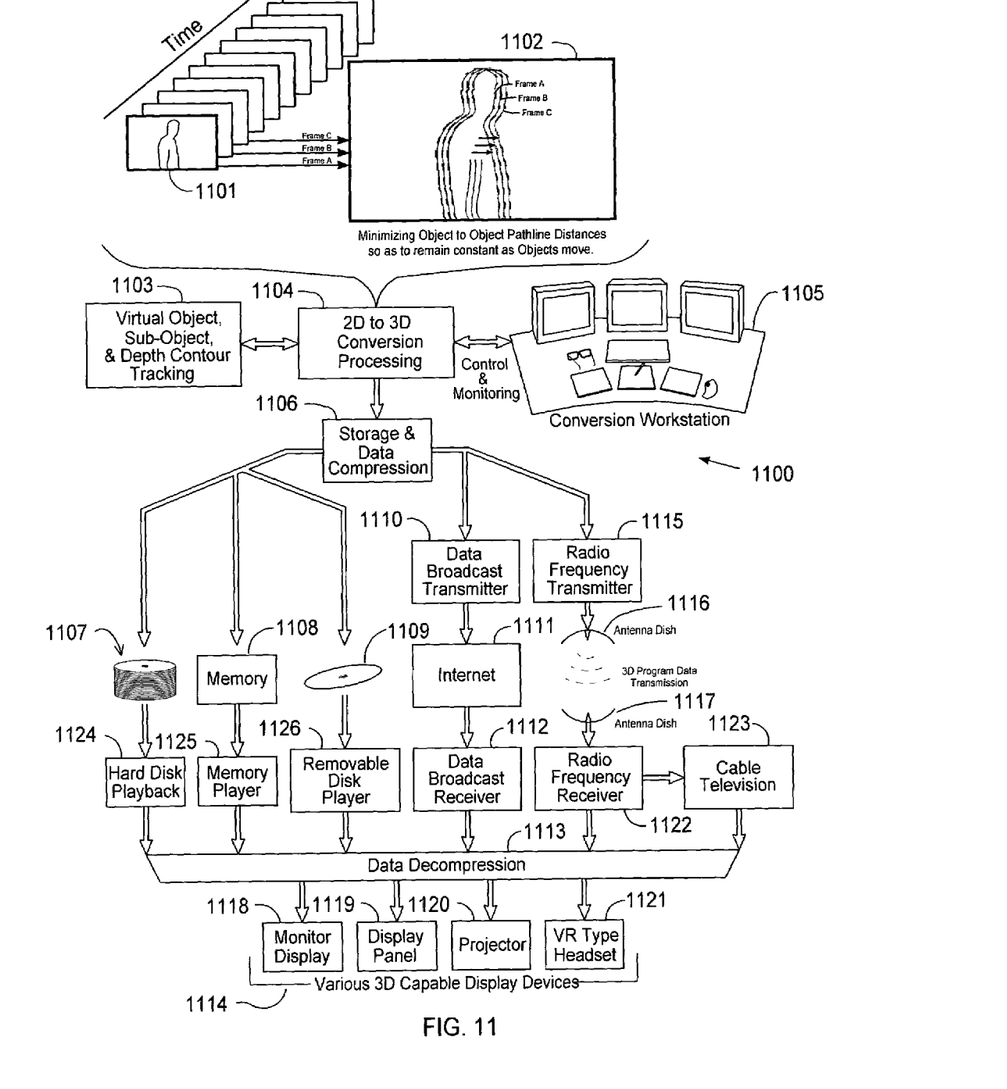
FIG. 11 illustrates an exemplary system and workstation for implementing the image processing techniques of the present invention.

FIG. 11 shows an exemplary system 1100 suitable for implementing the various methods of the present invention. During the process of converting images into 3D images, objects can be defined in their entirety as Virtual Objects regardless of whether parts of their surfaces are hidden or not. These virtual objects may contain one or more sub-objects, as well as contour information in the form of points or pathlines for providing depth shape to the objects. Various principles of the present invention embody tracking techniques to track and maintain consistent object to object pathline spacing relationships, indicated at block 1103, which in turn, prevent (or substantially prevent) noticeable artifacts from occurring. An image frame 1101 (Frame A) is the first of a sequence of frames (Frame A, B, C, etc.). The first 3 frames of the sequence are shown overlaid in one frame 1102, representing the consistent object to object pathline tracking according to the present invention.

Various principles of the present invention are embodied in an interactive user interface and a plurality of image processing tools that allow a user to rapidly convert a large number of images or frames to create authentic and realistic appearing three-dimensional images. In the illustrated example system 1100, the 2D-to-3D conversion processing, indicated at block 1104, is implemented and controlled by a user working at a conversion workstation 1105. It is here, at a conversion workstation 1105, that the user gains access to the interactive user interface and the image processing tools and controls and monitors the results of the 2D-to-3D conversion processing. It should be understood that the functions implemented during the 2D-to-3D processing can be performed by one or more processor/controller. Moreover, these functions can be implemented employing a combination of software, hardware and/or firmware taking into consideration the particular requirements, desired performance levels, etc. for a given system or application.

The three-dimensional converted product and its associated working files can be stored (storage and data compression 1106) on hard disk, in memory, on tape, or on any other means of data storage. In the interest of conserving space on the above-mentioned storage devices, it is standard practice to data compress the information; otherwise files sizes can become extraordinarily large especially when full-length motion pictures are involved. Data compression also becomes necessary when the information needs to pass through a system with limited bandwidth, such as a broadcast transmission channel, for instance, although compression is not absolutely necessary to the process if bandwidth limitations are not an issue.

The three-dimensional converted content data can be stored in many forms. The data can be stored on a hard disk 1107 (for hard disk playback 1124), in removable or non-removable memory 1108 (for use by a memory player 1125), or on removable disks 1109 (for use by a removable disk player 1126), which may include but are not limited to digital versatile disks (dvd's). The three-dimensional converted product can also be compressed into the bandwidth necessary to be transmitted by a data broadcast receiver 1110 across the Internet 1111, and then received by a data broadcast receiver 1112 and decompressed (data decompression 1113), making it available for use via various 3D capable display devices 1114 (e.g., a monitor display 1118, possibly incorporating a cathode ray tube (CRT), a display panel 1119 such as a plasma display panel (PDP) or liquid crystal display (LCD), a front or rear projector 1120 in the home, industry, or in the cinema, or a virtual reality (VR) type of headset 1121.)

Similar to broadcasting over the Internet, the product created by the present invention can be transmitted by way of electromagnetic or radio frequency (RF) transmission by a radio frequency transmitter 1115. This includes direct conventional television transmission, as well as satellite transmission employing an antenna dish 1116. The content created by way of the present invention can be transmitted by satellite and received by an antenna dish 1117, decompressed, and viewed on a monitor display 1118, possibly incorporating a cathode ray tube (CRT), a display panel 1119 such as a plasma display panel (PDP) or liquid crystal display (LCD), a front or rear projector 1120 in the home, industry, or in the cinema, or a virtual reality (VR) type of headset 1121. If the three-dimensional content is broadcast by way of RF transmission, the receiver 1122, can in feed decompression circuitry directly, or feed a display device directly. Either is possible. It should be noted however that the content product produced by the present invention is not limited to compressed data formats. The product may also be used in an uncompressed form. Another use for the product and content produced by the present invention is cable television 1123.

Although the present invention has been described in terms of the example embodiments above, numerous modifications and/or additions to the above-described embodiments would be readily apparent to one skilled in the art. It is intended that the scope of the present invention extends to all such modifications and/or additions.

We claim:

1. A method for converting two-dimensional images into three-dimensional images, comprising:
    tracking an object in an image, the object having an object edge and an object outline thereabout, from frame to frame over a sequence of images; and
    creating object outlines in subsequent frames for converting two-dimensional images into three-dimensional images maintaining an object outline to object edge distance spacing relationship as the object moves or changes from frame to frame;
    wherein a virtual object corresponding to the object is defined such that the virtual object is tracked and the object outlines generated independent of whether the object is obstructed from view in a subsequent frame by another object moving into the foreground.

2. The method for converting two-dimensional images into three-dimensional images of claim 1, wherein:
    one or more sub-objects contained within the object are defined such that the sub-objects are linked together and tracked as the object moves or changes from frame to frame.

3. The method for converting two-dimensional images into three-dimensional images of claim 1, wherein the object outlines obey a maximum error threshold relative to an initial frame of definition.

4. The method for converting two-dimensional images into three-dimensional images of claim 1, wherein:
    the object outlines are created employing a pixel image data tracking technique.

5. A method for converting two-dimensional images into three-dimensional images, comprising:
    tracking an object in an image, the object having an object edge and an object outline thereabout, from frame to frame over a sequence of images; and
    creating object outlines in subseciuent frames for converting two-dimensional images into three-dimensional images maintaining an object outline to object edge distance spacing relationship as the object moves or changes from frame to frame;
    wherein one or more points contained within the object are associated with depth information and defined such that the one or more points track the object as the object moves or changes from frame to frame.

6. The method for converting two-dimensional images into three-dimensional images of claim 5, wherein:
    one or more sub-objects contained within the object are defined such that the sub-objects are linked together and tracked as the object moves or changes from frame to frame.

7. The method for converting two-dimensional images into three-dimensional images of claim 5, wherein the object outlines obey a maximum error threshold relative to an initial frame of definition.

8. The method for converting two-dimensional images into three-dimensional images of claim 5, wherein:
    the object outlines are created employing a pixel image data tracking technique.

9. A method for converting two-dimensional images into three-dimensional images, comprising:
    tracking an object in an image, the object having an object edge and an object outline thereabout, from frame to frame over a sequence of images; and
    creating object outlines in subseciuent frames for converting two-dimensional images into three-dimensional images maintaining an object outline to object edge distance spacing relationship as the object moves or changes from frame to frame;
    wherein one or more contour pathlines contained within the object are associated with depth contour information and defined such that the one or more contour pathlines track the object as the object moves or changes from frame to frame.

10. The method for converting two-dimensional images into three-dimensional images of claim 9, wherein:
    one or more sub-objects contained within the object are defined such that the sub-objects are linked together and tracked as the object moves or changes from frame to frame.

11. The method for converting two-dimensional images into three-dimensional images of claim 9, wherein the object outlines obey a maximum error threshold relative to an initial frame of definition.

12. The method for converting two-dimensional images into three-dimensional images of claim 9, wherein:
    the object outlines are created employing a pixel image data tracking technique.

13. A method for converting two-dimensional images into three-dimensional, comprising:
    tracking an object in an image, the object having an object edge and an object outline thereabout, from frame to frame over a sequence of images;
    creating object outlines in subsequent frames for converting two-dimensional images into three-dimensional images maintaining an object outline to object edge distance spacing relationship as the object moves or changes from frame to frame; and
    selecting a severity of regulation for the distance spacing relationship to force errors in the object outlines to an acceptable tolerance.

14. The method for converting two-dimensional images into three-dimensional images of claim 13, wherein:
one or more sub-objects contained within the object are defined such that the sub-objects are linked together and tracked as the object moves or changes from frame to frame.

15. The method for converting two-dimensional images into three-dimensional images of claim 13, wherein the object outlines obey a maximum error threshold relative to an initial frame of definition.

16. The method for converting two-dimensional images into three-dimensional images of claim 13, wherein:
the object outlines are created employing a pixel image data tracking technique.

17. A method for converting two-dimensional images into three-dimensional images, comprising:
tracking an object in an image, the object having an object edge and an object outline thereabout, from frame to frame over a sequence of images; and
creating object outlines in subsecuent frames for converting two-dimensional images into three-dimensional images maintaining an object outline to object edge distance spacing relationship as the object moves or changes from frame to frame;
wherein the object outlines are created employing a key frame curve interpolation technique.

18. The method for converting two-dimensional images into three-dimensional images of claim 17, wherein:
one or more sub-objects contained within the object are defined such that the sub-objects are linked together and tracked as the object moves or changes from frame to frame.

19. The method for converting two-dimensional images into three-dimensional images of claim 17, wherein the object outlines obey a maximum error threshold relative to an initial frame of definition.

20. The method for converting two-dimensional images into three-dimensional images of claim 17, wherein:
the object outlines are created employing a pixel image data tracking technique.

21. A method for converting two-dimensional images into three-dimensional images, comprising:
tracking an object in an image, the object having an object edge and an object outline thereabout, from frame to frame over a sequence of images; and
creating object outlines in subsecuent frames for converting two-dimensional images into three-dimensional images maintaining an object outline to object edge distance spacing relationship as the object moves or changes from frame to frame;
wherein the object outlines are created employing a combination of pixel image data tracking and key frame curve interpolation techniques.

22. The method for converting two-dimensional images into three-dimensional images of claim 21, wherein:
one or more sub-objects contained within the object are defined such that the sub-objects are linked together and tracked as the object moves or changes from frame to frame.

23. The method for converting two-dimensional images into three-dimensional images of claim 21, wherein the object outlines obey a maximum error threshold relative to an initial frame of definition.

24. The method for converting two-dimensional images into three-dimensional images of claim 21, wherein:
the object outlines are created employing a pixel image data tracking technique.

25. A method for converting two-dimensional images into three-dimensional images, comprising:
defining an area of pixels around an object within an image frame of an image sequence, resulting in an outline of the object spaced a particular distance from edges of the object;
tracking the object as the object moves or changes from frame to frame; and
re-creating the outline in a different frame of the image sequence maintaining relative distances between the edges of the object and the outline to create a different perspective for a three-dimensional image.

26. The method for converting two-dimensional images into three-dimensional images of claim 25, further comprising:
defining a virtual object corresponding to the object such that the virtual object is tracked and the outlines generated independent of whether the object is obstructed from view in a subsequent frame by another object moving into the foreground.

27. The method for converting two-dimensional images into three-dimensional images of claim 25, further comprising:
defining one or more sub-objects contained within the object such that the sub-objects are linked together and tracked as the object moves or changes from frame to frame.

28. The method for converting two-dimensional images into three-dimensional images of claim 25, further comprising:
defining one or more points contained within the object and associated with depth information such that the one or more points track the object as the object moves or changes from frame to frame.

29. The method for converting two-dimensional images into three-dimensional images of claim 25, further comprising:
defining one or more contour pathlines contained within the object and associated with depth contour information such that the one or more contour pathlines track the object as the object moves or changes from frame to frame.

30. The method for converting two-dimensional images into three-dimensional images of claim 25, wherein the outlines obey a maximum error threshold relative to an initial frame of definition.

31. The method for converting two-dimensional images into three-dimensional images of claim 25, further comprising:
selecting a severity of regulation for the distance spacing relationship to force errors in the outlines to an acceptable tolerance.

32. The method for converting two-dimensional images into three-dimensional images of claim 25, wherein:
the outlines are created employing a pixel image data tracking technique.

33. The method for converting two-dimensional images into three-dimensional images of claim 25, wherein:
the outlines are created employing a key frame curve interpolation technique.

34. The method for converting two-dimensional images into three-dimensional images of claim 25, wherein:
the outlines are created employing a combination of pixel image data tracking and key frame curve interpolation techniques.

35. A method for converting two-dimensional images into three-dimensional images, comprising:
- defining an object within an image frame of an image sequence, resulting in an outline of the object spaced a particular distance from a perimeter of the object;
- tracking the object as the object moves or changes from frame to frame; and
- re-creating the outline in different frames of the image sequence maintaining relative distances between the perimeter of the object and the outline to create an alternate perspective for a three-dimensional image sequence.

36. The method for converting two-dimensional images into three-dimensional images of claim 35, further comprising:
- defining a virtual object corresponding to the object such that the virtual object is tracked and the outlines generated independent of whether the object is obstructed from view in a subsequent frame by another object moving into the foreground.

37. The method for converting two-dimensional images into three-dimensional images of claim 35, further comprising:
- defining one or more sub-objects contained within the object such that the sub-objects are linked together and tracked as the object moves or changes from frame to frame.

38. The method for converting two-dimensional images into three-dimensional images of claim 35, further comprising:
- defining one or more points contained within the object and associated with depth information such that the one or more points track the object as the object moves or changes from frame to frame.

39. The method for converting two-dimensional images into three-dimensional images of claim 35, further comprising:
- defining one or more contour pathlines contained within the object and associated with depth contour information such that the one or more contour pathlines track the object as the object moves or changes from frame to frame.

40. The method for converting two-dimensional images into three-dimensional images of claim 35, wherein the outlines obey a maximum error threshold relative to an initial frame of definition.

41. The method for converting two-dimensional images into three-dimensional images of claim 35, further comprising:
- selecting a severity of regulation for the distance spacing relationship to force errors in the outlines to an acceptable tolerance.

42. The method for converting two-dimensional images into three-dimensional images of claim 35, wherein:
- the outlines are created employing a pixel image data tracking technique.

43. The method for converting two-dimensional images into three-dimensional images of claim 35, wherein:
- the outlines are created employing a key frame curve interpolation technique.

44. The method for converting two-dimensional images into three-dimensional images of claim 35, wherein:
- the outlines are created employing a combination of pixel image data tracking and key frame curve interpolation techniques.

* * * * *